United States Patent [19]

Andō

[11] Patent Number: 4,546,460

[45] Date of Patent: Oct. 8, 1985

[54] VIDEODISC AUTOFOCUS DEVICE

[75] Inventor: Hideo Andō, Tokyo, Japan

[73] Assignee: Tokyo Shibaura Denki Kabushiki Kaisha, Kawasaki, Japan

[21] Appl. No.: 430,387

[22] Filed: Sep. 30, 1982

[30] Foreign Application Priority Data

Oct. 22, 1981 [JP] Japan .................. 56-168967

[51] Int. Cl.⁴ ........................................ G11B 7/12
[52] U.S. Cl. ......................... 369/45; 369/46; 369/118; 369/120; 250/201
[58] Field of Search ................ 369/44, 45, 46, 118, 369/119, 120, 111, 112; 250/201, 578, 201 D, 201 F, 201 R

[56] References Cited

U.S. PATENT DOCUMENTS

| | | | |
|---|---|---|---|
| 3,876,841 | 4/1975 | Kramer | 369/46 |
| 4,011,400 | 3/1977 | Simons | 369/46 |
| 4,079,247 | 5/1976 | Bricot | 250/201 R |
| 4,079,248 | 3/1978 | Lehureau | 250/201 |
| 4,243,848 | 1/1981 | Utsumi | 369/45 |
| 4,368,526 | 1/1983 | Horigae | 369/45 |
| 4,376,303 | 3/1983 | Lurie | 369/46 |
| 4,445,208 | 4/1984 | Yamamoto | 369/46 |

FOREIGN PATENT DOCUMENTS

| | | |
|---|---|---|
| 0075192 | 3/1983 | European Pat. Off. . |
| 0095852 | 12/1983 | European Pat. Off. . |
| 49-31128 | 3/1974 | Japan .................. 369/45 |
| 10407 | 1/1978 | Japan .................. 369/45 |
| 28405 | 3/1978 | Japan .................. 369/45 |
| 118103 | 10/1978 | Japan .................. 369/45 |
| 56-111136 | 1/1980 | Japan . |
| 133704 | 10/1981 | Japan .................. 369/45 |
| 57-198547 | 12/1982 | Japan . |
| 7309839 | 1/1975 | Netherlands . |
| 7414776 | 5/1976 | Netherlands . |
| 7508052 | 1/1977 | Netherlands . |
| 7803969 | 10/1979 | Netherlands . |

Primary Examiner—Alan Faber
Attorney, Agent, or Firm—Cushman, Darby & Cushman

[57] ABSTRACT

A focusing arrangement for an optical disk system that inhibits focus servo loop operation when the optical head objective lens is outside of a focus range distance with respect to the disk. In the optical head a laser beam converged by the objective lens is projected onto the light-reflecting layer of an optical disk. The laser beam reflected from the light-reflecting layer of the disk is projected to the light-receiving surface of a photodetector through the objective lens, a light shielding plate, a projection lens and a cylindrical lens. The laser beam is then projected to the light-receiving surface of the photodetector, thus forming a pattern thereon. As the objective lens moves along its optical axis, the laser beam is deviated and the pattern moves in a specific direction. The photodetector comprises first and second photosensitive regions. When the objective lens lies at a distance shorter than a first predetermined distance from the light-reflecting layer, the pattern is formed on the first photosensitive region. When the objective lens lies at a distance longer than the second predetermined distance, the pattern is formed on the first photosensitive region. When the objective lens is located at a distance longer than the first predetermined distance and shorter than the second predetermined distance, the pattern is formed on the second photosensitive region.

16 Claims, 33 Drawing Figures

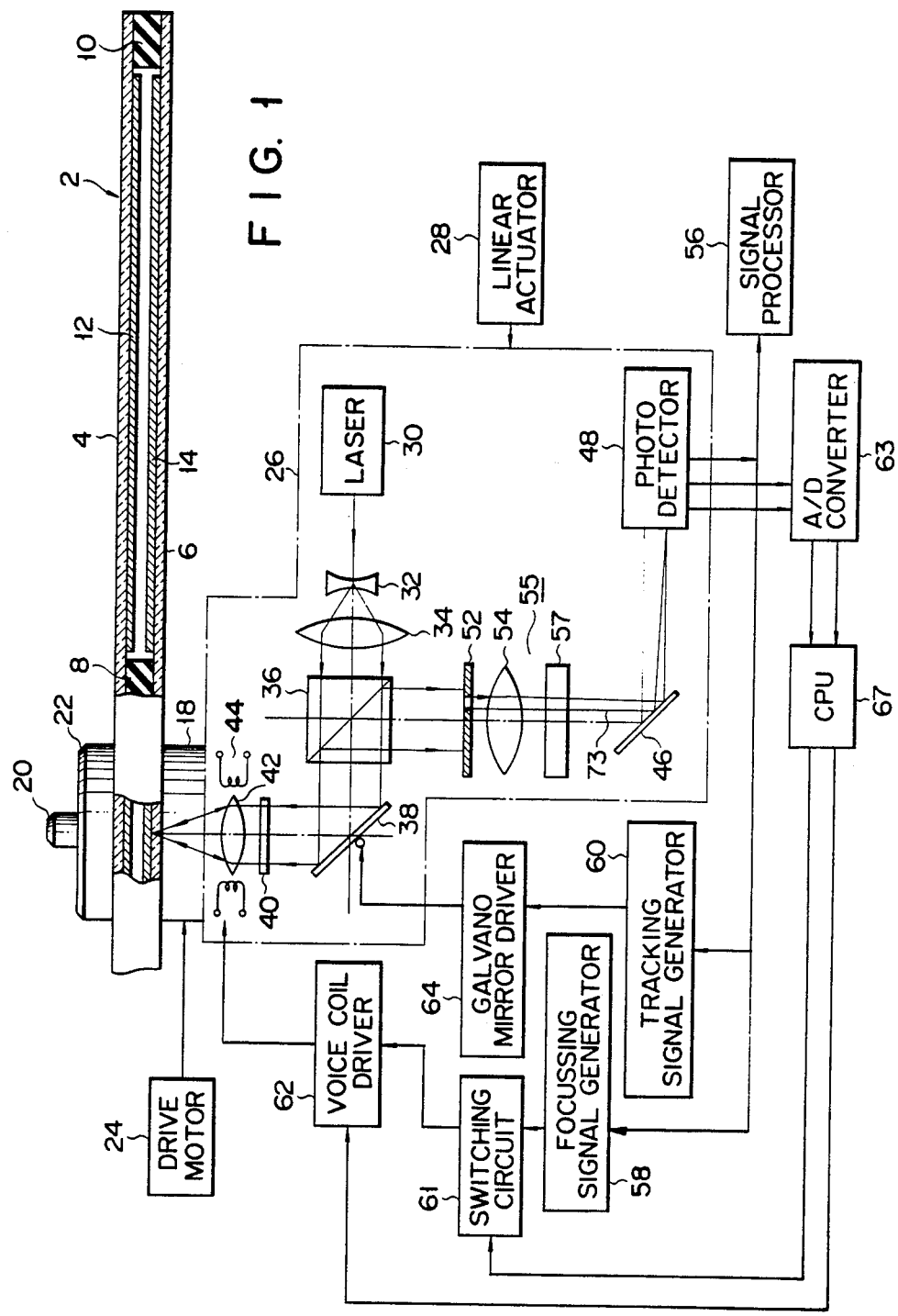
F I G. 1

FIG. 2A
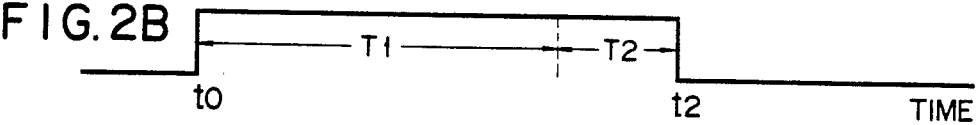
FIG. 2B
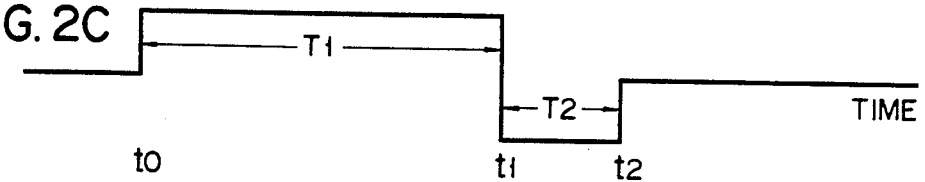
FIG. 2C
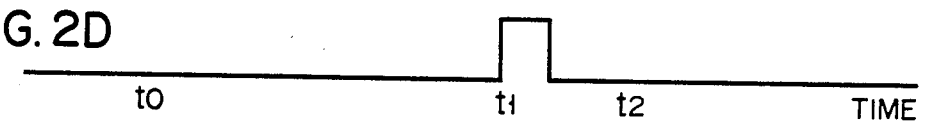
FIG. 2D
FIG. 4A
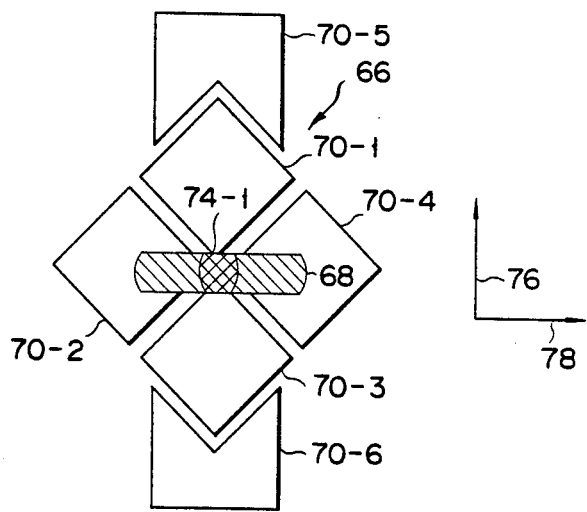

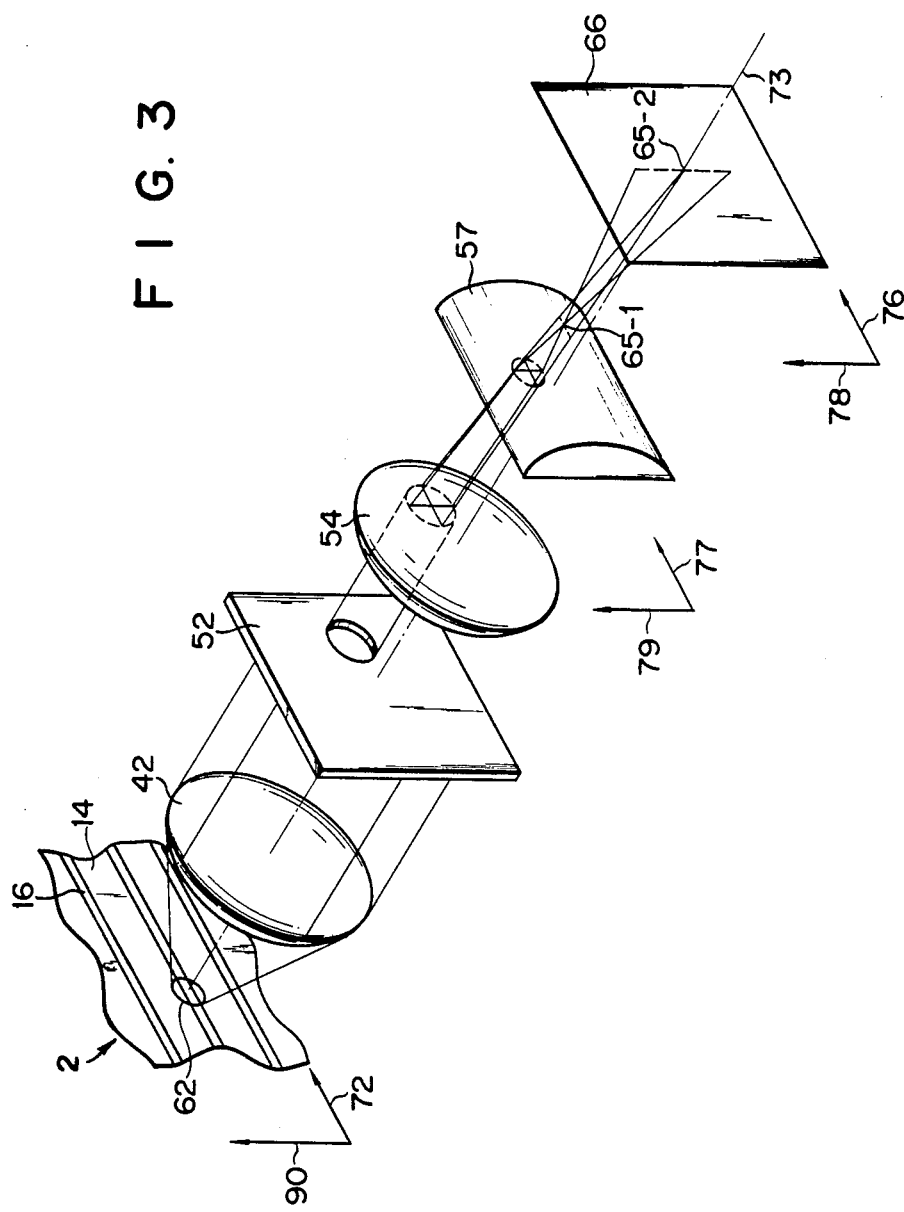

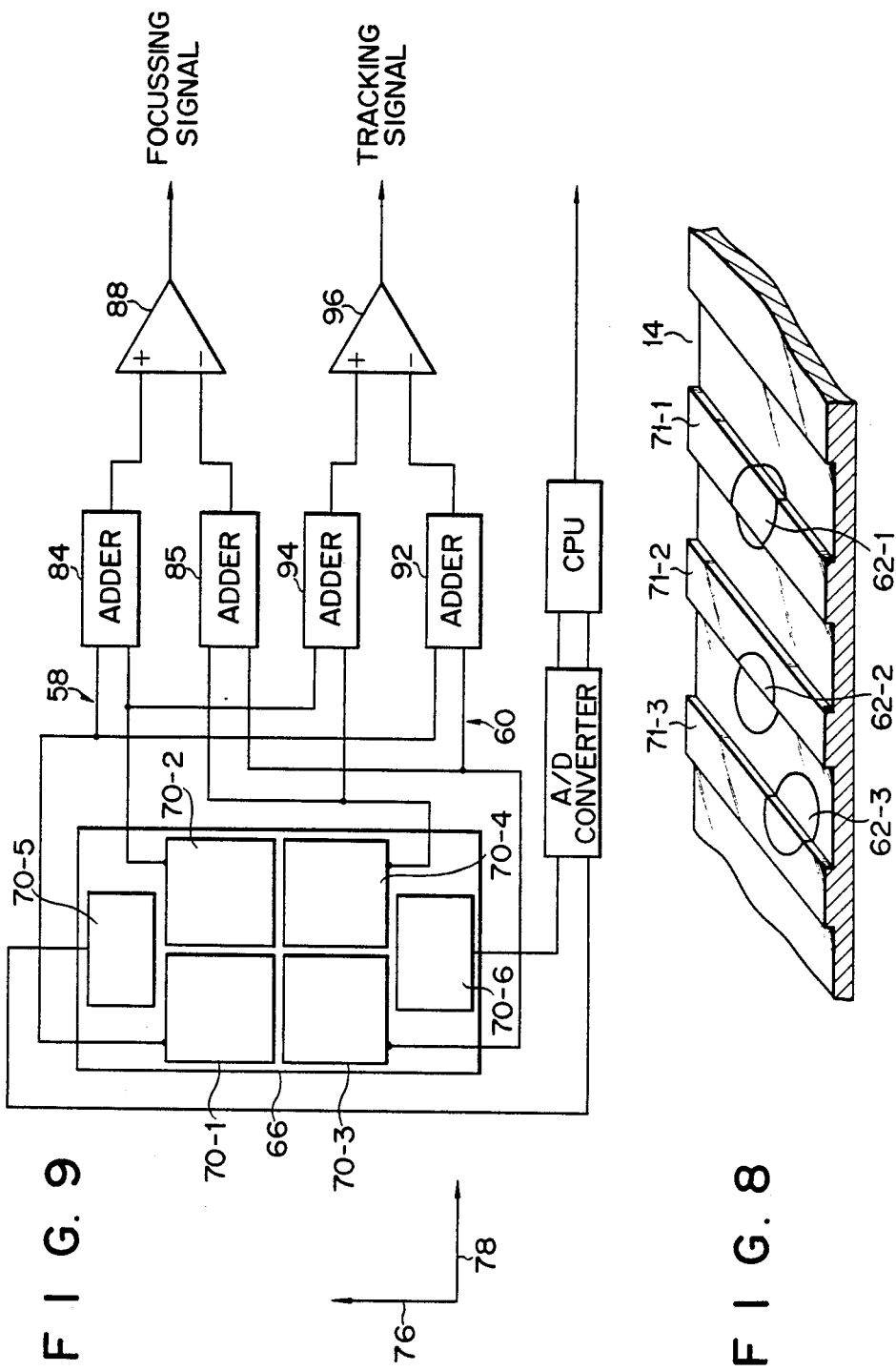

VIDEODISC AUTOFOCUS DEVICE

BACKGROUND OF THE INVENTION

The present invention relates to an optical system for reading from and/or writing information on an information recording and/or reproducing medium such as an optical disk and, more particularly, to an optical head for projecting a laser beam onto an information recording and/or reproducing medium to read from and write information on it.

In an optical system which reads out from or writes information on an information recording and/or reproducing medium, a laser beam is projected onto the information recording and/or reproducing medium (to be referred to as an optical disk hereinafter) through an optical head. The laser beam reflected from the optical disk is picked up by the optical head. In order to write information on the optical disk and read it out therefrom properly, the focal point of an objective lens of the optical head must be accurately placed on the light-reflecting surface of the optical disk. In other words, the beam waist of the laser beam converged by the objective lens must be projected onto the optical disk. Various apparatuses have been developed to detect the just focusing state or in-focus state of the objective lens. However, none of them is satisfactory. For example, an apparatus which utilizes the difference between sizes of focused and defocused beam spots on the optical disk is proposed wherein different patterns of the just focused and defocused beam spots are projected onto a photodetector and are detected by the photodetector to achieve proper focusing. Further, an apparatus for focusing a laser beam, which is provided with a lens system combining a convex lens and a cylindrical lens is disclosed in U.S. Pat. No. 4,079,247 of Bricot et al. In these apparatuses, if minute recess or projections are formed on the optical disk, a diffraction pattern is formed in the beam spot pattern on the photodetector, resulting in erroneous operation. Especially, in an optical disk which has a tracking guide to increase information recording capacity, a diffraction pattern of the tracking guide is formed in the beam spot pattern on the photodetector when the beam spot is formed on the tracking guide. As a result, the apparatus may be erroneously operated.

In the apparatus described above, the defocusing state of the objective lens is detected by changes in the size of the beam spot pattern on the photodetector or in the shape of the beam spot pattern. Another apparatus is proposed which detects the defocusing state of the objective lens by the location of a beam spot pattern formed on a photodetector. In this apparatus, a laser beam for detecting the defocusing state of the objective lens is incident on the objective lens projected onto the optical disk therethrough, in addition to laser beams which are used for readout and writing of information. However, it has a drawback that the optical system becomes complex and the apparatus is manufactured at high cost, because the optical system having at least two optical paths for the laser beams is required. Other apparatuses are disclosed in Japanese Patent Disclosure Nos. 53-28405, and 53-10407, respectively. In these apparatuses, laser beams for reading out and writing information are not transmitted on an optical axis of an objective lens but are transmitted in parallel to the axis thereof. However, in these apparatuses the laser beams cannot be sufficiently converged by the objective lens, and a sufficiently small beam spot cannot be formed on the optical disk. Further, since the laser beams pass through the outer peripheral portion of the objective lens and are projected onto the optical disk, the intensity of laser beams projected onto the optical disk is decreased by eclipse.

Further, an apparatus is disclosed in Japanese Patent Disclosure No. 53-118103, in which a prism is arranged on an optical path of laser beams reflected by an optical disk. In this apparatus, the intensity of the laser beams may attenuate when they pass through the prism, and unwanted diffraction may occur.

Although the various aforementioned drawbacks are peculiar to the optical system of an optical head, the inventor hereof has revealed that the photodetector provided in the system for detecting the defocusing state of the objective lens also involves a problem to be solved.

It is possible with the known optical head that the objective lens fails to come into the just focusing state in response to a signal from the photodetector. This may occur when the objective lens lies too close to the optical disk or too far from the optical disk. If the objective lens is located too close to, or too far from, the optical disk, the level of the signal from the photodetector is low and contains much noise. Since the defocusing state is detected from this signal, the system will perform a faulty operation, thus bringing the objective lens into contact with the optical disk or holding the objective lens in defocusing state. It is therefore necessary to determine whether or not the objective lens can be brought into just focusing state, no matter whether it is in defocusing state or an abnormal state (i.e. unfocusing state).

SUMMARY OF THE INVENTION

It is therefore an object of the present invention to provide an optical system for accurately detecting the focusing state of an objective lens.

Another object of the invention is to provide an optical system which detects that an objective lens is in unfocusing state and unable to come into just focusing state, thereby to quickly and accurately bring the objective lens into defocusing state so that the lens may come into just focusing state.

According to the invention, a system for focusing a light beam on a light-reflecting surface is provided, which comprises means for generating a light beam; an objective lens for converging a light beam and projecting it to the light-reflecting surface; means for transferring a light beam reflected from the light-reflecting surface; and a photodetector having a first section comprised of at least one photosensitive region and a second section comprised of at least two photosensitive regions, said first section receiving a light beam from the light beam transferring means when the objective lens lies at a distance shorter than a first predetermined distance from the light-reflecting surface or longer than a second predetermined distance from the light-reflecting surface, and said second section receiving a light beam from the light beam transferring means when the objective lens lies at a distance longer than the first predetermined distance and shorter than the second predetermined distance.

BRIEF DESCRIPTION OF THE DRAWINGS

FIG. 1 is a schematic block diagram of an optical system having an optical head according to the present invention;

FIGS. 2A to 2D are a timing chart of signals generated by an A/D converter and a CPU both shown in FIG. 1;

FIG. 3 is a perspective view of the optical system of the optical head shown in FIG. 1;

FIGS. 4A to 4G show various patterns formed on the light receiving surface of a photodetector shown in FIG. 3;

FIG. 8 is a perspective view of the light reflecting region of an optical disk, on which a laser beam lands;

FIG. 9 is a block diagram of another focusing signal generator and another tracking signal generator;

DETAILED DESCRIPTION OF THE PREFERRED EMBODIMENTS

Figure 4B:
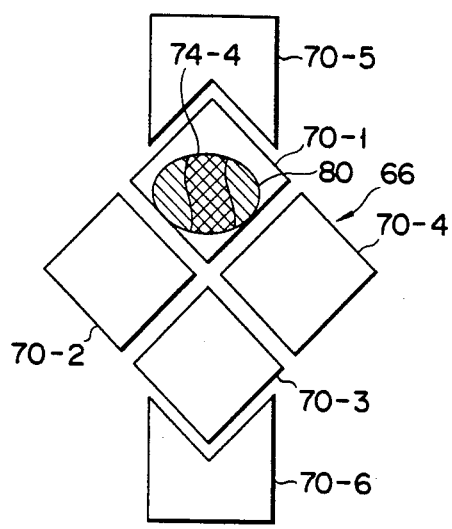

In FIG. 1, there is shown an optical system according to this invention in which information is read out from or written on an optical disk 2 as the information recording and/or reproducing medium. The optical disk 2 comprises a pair of disk-shaped transparent plates 4 and 6 which are held together by inner and outer spacers 8 and 10, as shown in FIG. 1. Light-reflecting layers 12 and 14 are deposited on inner surfaces of the transparent plates 4 and 6, respectively. Helical tracking guides 16 to be described later are formed on the light-reflecting layers 12 and 14, respectively, and information or data is recorded in the form of pits on the tracking guide 16. A through hole is formed at the center of the optical disk 2. When the optical disk 2 is placed on a turntable 18, a center spindle 20 of the turntable 18 is fitted into the through hole of the optical disk 2, such that the rotational center of the turntable 18 is aligned with that of the optical disk 2. A chucking element 22 is mounted on the spindle 20 to hold the optical disk 2 on the turntable 18. The turntable 18 is rotatably supported by a support member (not shown) and is driven at a constant speed by a drive motor 24.

The optical system shown in FIG. 1 has an optical head 26 to project a laser beam onto the surface of the light-reflecting layer 14 of the optical disk 2 and to write information on or read it out from the optical disk 2. The optical head 26 is radially movable along the optical disk 2 by a linear actuator 28 and has a laser 30 for generating laser beams. For writing information on the optical disk 2, laser beam of modulated intensity is generated from the laser 30. For reading out information from the optical disk 2, a laser beam having a predetermined intensity is generated from the laser 30. The laser beam generated from the laser 30 is diverged by a concave lens 32 and converted to a parallel laser beam by a convex lens 34. The parallel laser beam is then transmitted through a beam splitter 36 and is incident on a galvano mirror 38. The laser beam is then reflected by the galvano mirror 38, transmitted through a quarter wave plate 40, converged by an objective lens 42, and projected onto the surface of the light-reflecting layer 14 of the optical disk 2. The objective lens 42 is movably supported by voice coils 44 along an optical axis of the objective lens 42. When the focal point of the objective lens 42 is located on the surface of the light-reflecting layer 14 of the optical disk 2 by activation of the voice coils 44, the smallest beam spot corresponding to the beam waist of the laser beam is formed on the light-reflecting layer 14. Meanwhile, for writing information on the light-reflecting layer 14, pits are formed along the tracking guide on the light-reflecting layer 14 by intensity-modulated laser beam. Information is recorded in the form of pits on the tracking guide. For reading out information from the light-reflecting layer 14, the light beam is intensity-modulated by the pits formed along the tracking guide.

The laser beam reflected from the light-reflecting layer 14 is guided to the galvano mirror 38 through the objective lens 42 and the quarter wave plate 40. The laser beam reflected by the galvano mirror 38 is incident on the beam splitter 36. It passes through the quarter wave plate 40 twice before it is transmitted through the beam splitter 36 is directed toward the optical disk 2, where it is reflected from the optical disk 2 and returned to the beam splitter 36. Therefore, the laser beam returned to the beam splitter 36 is half-phase retarded from the laser beam directed toward the optical disk 2. As a result, the returned laser beam is reflected by the beam splitter 36 and is directed toward a mirror 46. The laser beam is then reflected by the mirror 46 and is incident on the photodetector 48. Thus, an image corresponding to the beam spot on the light-reflecting layer 14 is formed on the photodetector 48. A light-shielding plate 52 having an aperture and a lens system 55 having astigmation and comprised of a projection lens 54 or convex lens and a cylindrical lens 57 for projecting the laser beam onto the photodetector 48 are arranged between the beam splitter 36 and the mirror 46. The light shielding plate is preferably positioned at the Fourier transformer plane determined by the lens system 55. The aperture is cut at a position away from the intersection of the plate 52 and an optical axis of the lens 57. The plate may have a slit or a knife edge, instead of an aperture. The laser beam is converted into a photoelectric signal by a photodetector 48, which is then processed in a signal processor 56 and converted to digital information or data. The photoelectric signal is also supplied to a focusing signal generator 58 and to a tracking signal generator 60 which respectively generate a focusing signal and a tracking signal after processing of the received signal. The focusing signal is supplied through a switching circuit 61 to a voice coil driver 62, thus driving the voice coil 44. The objective lens 42 is thus moved along its optical axis, whereby the position of the focus of the objective lens 42 is adjusted. On the other hand, the tracking signal is supplied to a galvano mirror driver 64, thus adjusting the inclination of the mirror 38. As a result, the laser beam is directed to the tracking guide and the beam spot is accurately positioned along the tracking guide on the light-reflecting layer 14.

If the objective lens 42 gets too close to the light-reflecting layer 14, the photodetector 48 generates at time to such a photoelectric signal as shown in FIG. 2A, i.e. an alarm signal representing an abnormal state. The photoelectric signal is supplied to an A/D converter 63 and converted into a digital signal. The digital signal is supplied to a CPU 67. Upon receipt of the digital signal, i.e. the alarm signal, the CPU 67 generates a first unfocusing signal, which is supplied to the switching circuit 61 and the voice coil driver 62. As shown in FIG. 2B, the switching circuit 61 disconnects the voice coil driver 62 from the focusing signal generator 58 in response to the unfocusing signal. Accordingly, the voice coil 62 can no longer drive the voice coil 44 even if the focusing signal generator is supplying a focusing signal.

The first unfocusing signal from the CPU 67 is supplied also to the voice coil driver 62, thus actuating the voice coil driver 62. The voice coil driver 62 drives the voice coil 44 as shown in FIG. 2C. The coil 44 therefore moves the objective lens 42 away from the light-reflecting layer 14. Upon lapse of time $T_1$ after the objective lens 42 has started moving, the lens 42 comes to a position at a distance longer than a predetermined distance from the light-reflecting layer 14. Then, as shown in FIG. 2D, the photodetector 48 generates a second alarm signal representing an abnormal state. The alarm signal is supplied to the A/D converter 63 and converted into a digital signal. This digital signal is supplied to the CPU 67. In response to the digital signal, i.e. the second alarm signal, the CPU 67 generates a second unfocusing signal the duration of which is time $T_2$. The switching circuit 61 is thus kept open for time $T_2$ as shown in FIG. 2B, and the voice coil driver 62 causes the voice coil 44 to move the objective lens 42 toward the light-reflecting layer 14. Upon lapse of time $T_2$, the CPU 67 no longer supplied the second unfocusing signal. The switching circuit 61 therefore connects the voice coil driver 62 to the focusing signal generator 58, as shown in FIG. 2B. In response to a focusing signal from the focusing generator 58, not the second unfocusing signal, the voice coil driver 62 drives the voice coil 44. As a result, the objective lens 42 moves for time $T_2$ toward the light-reflecting layer 14 for the predetermined distance. In other words, the position of the objective lens 42 is adjusted by the focusing signal from the circuit 58. In case the objective lens 42 moves to a position at a distance longer than the predetermined distance from the light-reflecting layer 14, the system of FIG. 1 starts operating at time $t_1$ (FIG. 2A) in the same manner as described above.

The optical system illustrated in FIG. 1 will now be described in detail with reference to FIG. 3, FIGS. 4A to 4G, FIGS. 5A to 5E and FIGS. 6A to 6E.

The optical elements of the optical system shown in FIG. 1 are arranged as schematically illustrated in FIG. 3. When the objective lens 42 is in a just focusing state or in focus, the laser beam is converged by the objective lens 42 and a beam waist 62 is formed on the objective lens 42. That is, the smallest beam is formed on the light-reflecting layer 14. When parallel beams come through the objective lens 42, the beam waist 62 is formed on the focus of the objective lens 42. When the objective lens 42 is in the just focusing state, the distance between the lens 42 and the light-reflecting layer 14 is maintained equal to the focal length of the objective lens 42. When slightly diverged or converged laser beam is projected through the objective lens 42, the beam waist 62 is not formed on the focus of the objective lens 42, but formed in the vicinity of the focus of the objective lens 42. The light-receiving surface 66 of the photodetector 48 is located at one of the image-forming points 65-1 and 65-2 so that the image of beam waist may be formed on it by the objective lens 42, projection lens 54 and cylindrical lens 57. As is well known, the cylindrical lens 57 has a longitudinal and a lateral magnification which differs from each other. A lens system 55 made of a combination of this cylindrical lens 57 and projection lens 54 has a long and a short focal point. As shown in FIG. 3, therefore, the beam waist image is formed on the first- and second-image forming points 65-1 and 65-2, and the light-receiving surface 66 is located at either of the first- and second-image forming points 65-1 and 65-2. When the base line of the cylindrical lens 57 is arranged along the direction 77 as shown in FIG. 2, the light-receiving surface 66 is located at the second-image forming point 65-2 spaced from the cylindrical lens 57, and when the base line of the cylindrical lens 57 is arranged along the direction 79 perpendicular to the direction 77, the light-receiving surface 66 is located at the first image forming point 65-1 near the cylindrical lens 57. More preferably, the base line of cylindrical lens 57 should be arranged along the direction 77 and the light-receiving surface 66 should be located at the second-image forming point 65-2, as shown in FIG. 2, in order to obtain enough precision in the detection of the focusing state and the follow up of the tracking guide. When a parallel laser beam is projected through the objective lens 42 and the beam waist 62 is formed by the objective lens 42 on the light-reflecting laser 14 located on the focal point of said objective lens 42, the image-forming points 65-1 and 65-2 respectively coincide with the short and long focal points of the lens system 55 consisting of the cylindrical lens 57 and projection lens 54. Further the aperture of the light-shielding plate 50 is formed apart from the optical axis 73 in the direction 77. Here the direction 77 is substantially parallel with the direction in which the tracking guide 16 is extending, and the direction 79 is substantially parallel with the direction in which the beam waist 62 is moved in order to trace the tracking guide 16.

Further the direction 76, in which as is explained later, the beam waist image is moved on the light-receiving surface 66, is substantially parallel with the direction 77, and the direction 78 in which the pattern or image of tracking guide moves within the beam waist image on the light-receiving surface 66 is parallel with the direction 79. These directions 72, 76, 77, 78 and 79 have no such relationship as mentioned above in the optical system shown in FIG. 1 because the optical axis 73 is bent by the galvano mirror 38 and mirror 46, but have this relationship when, as shown in FIG. 3, the optical elements 14, 42, 50, 54, 57 and 66 are rearranged on the straight optical axis 73.

The light-receiving surface 66 of the photodetector 48 is comprised of a square array of four square photosensitive regions 70-1, 70-2, 70-3 and 70-4. Two oppositely notched photosensitive regions 70-5 and 70-6 are arranged relative to the square array of the photosensitive regions 70-1 to 70-4 such that their notches conform to the corresponding corners of the two photosensitive regions which are diagonally arranged as shown in FIGS. 4A to 4G. The center of the light-receiving surface is located on the optical axis 73. Further, the four photosensitive regions 70-1 to 70-4 are arranged along the directions 76 and 78, and the photosensitive regions 70-5 and 70-6 are arranged along the direction 76.

Figure 4C:
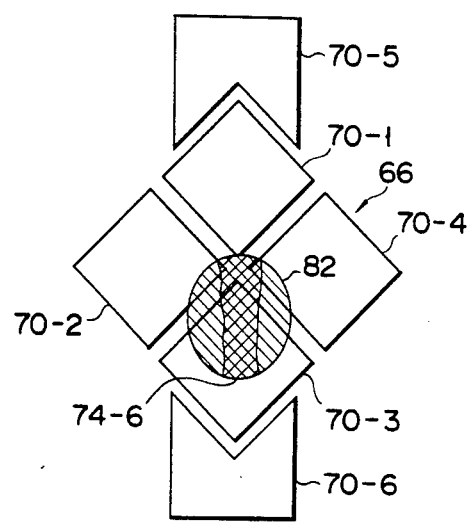
Figure 4D:
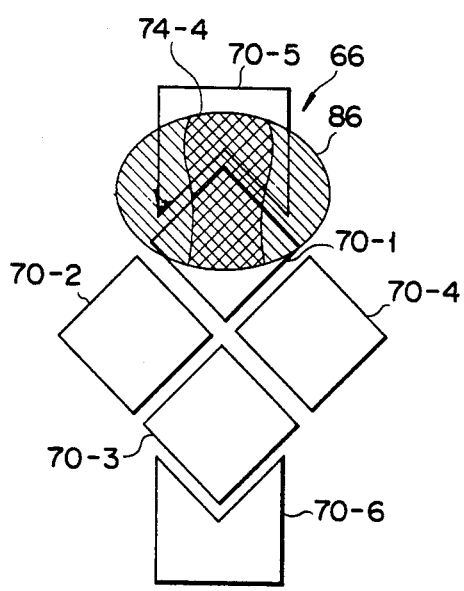
Figure 4E:
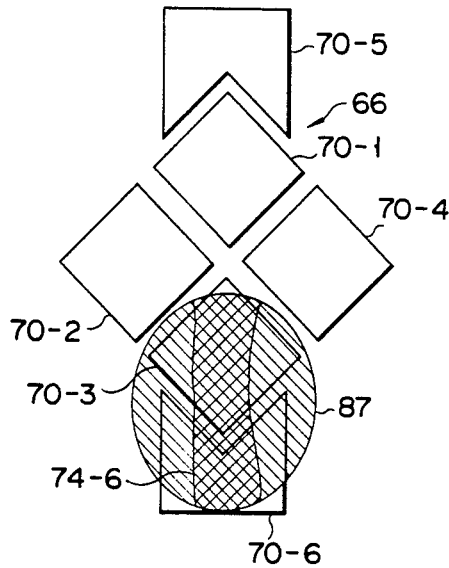
Figure 4F:
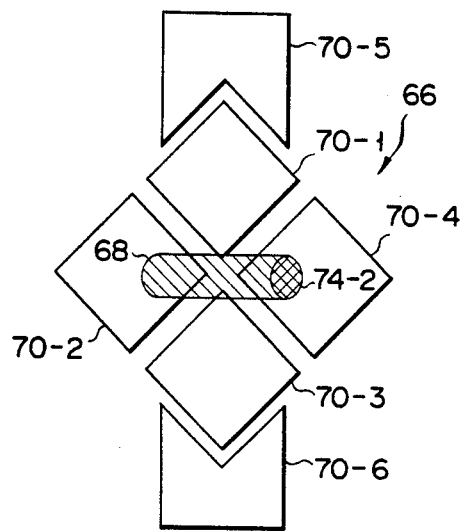
Figure 4G:
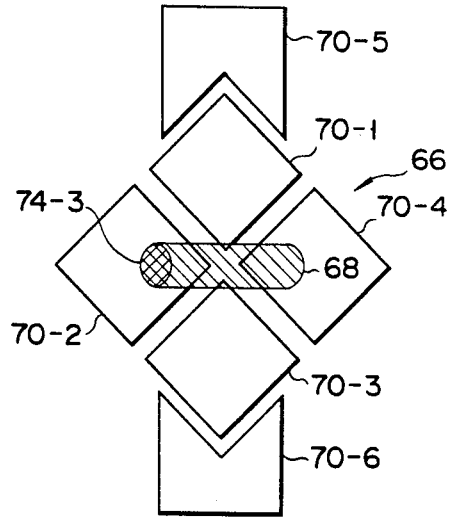
Figure 5A:
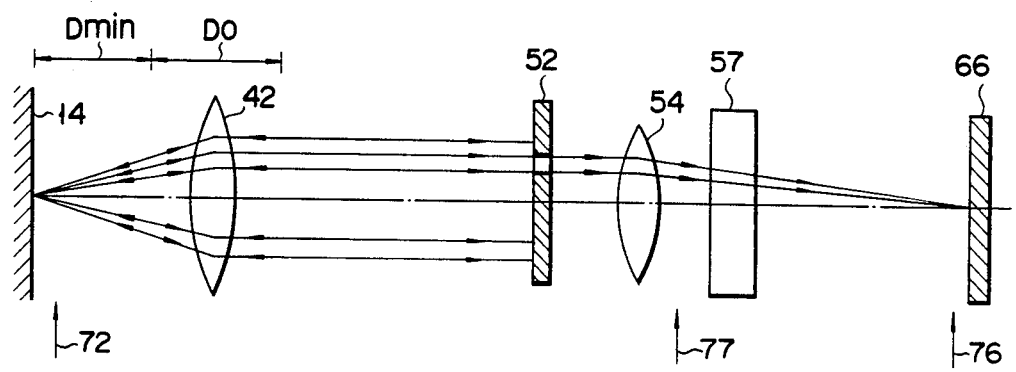
FIGS. 5A to 5E and FIGS. 6A to 6E illustrate optical paths of a laser beam in the optical system shown in FIG. 3.
Figure 5B:
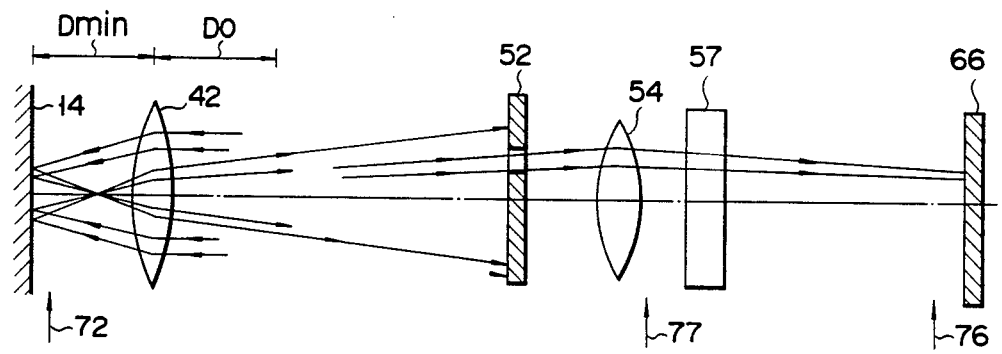
Figure 5C:
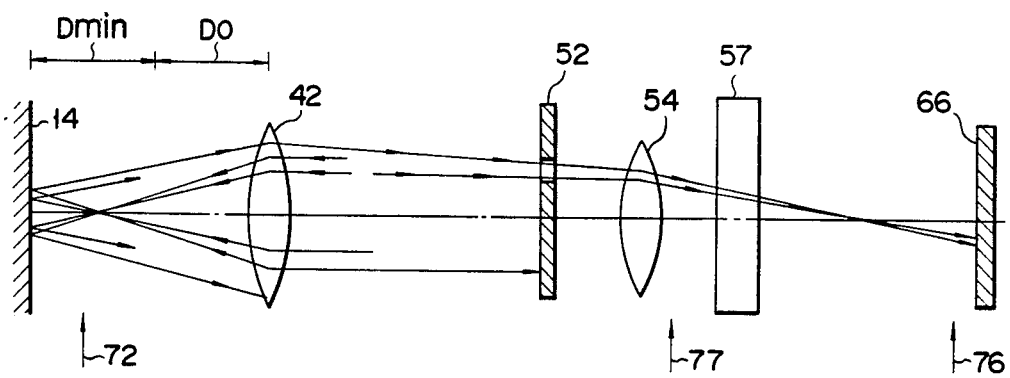
Figure 5D:
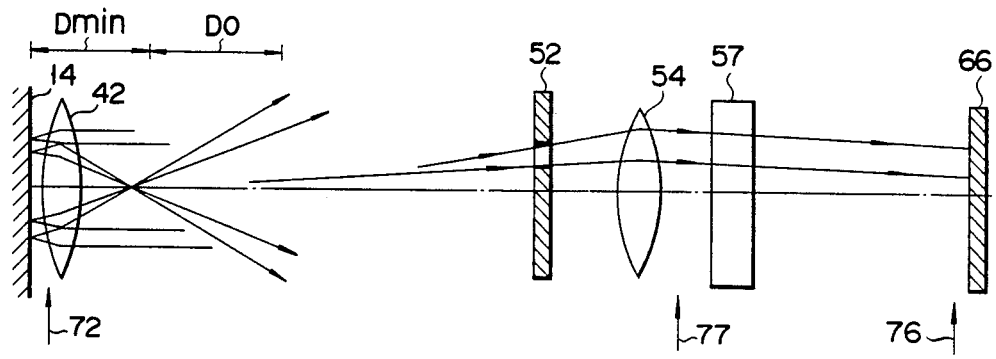
Figure 5E:
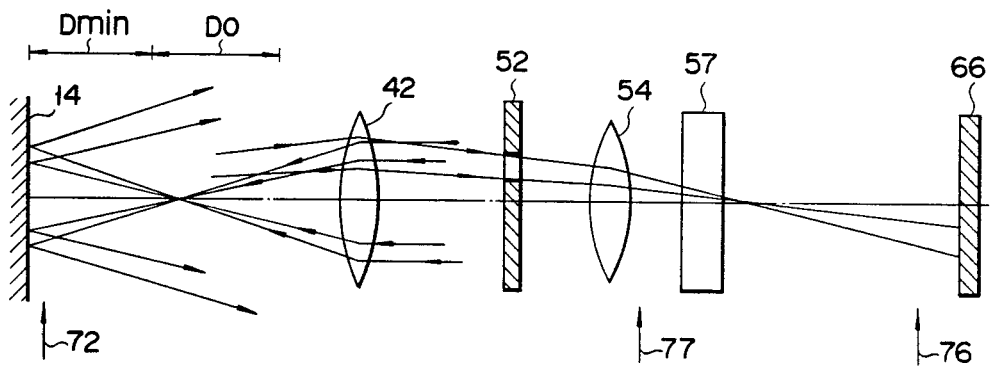
Figure 6A:
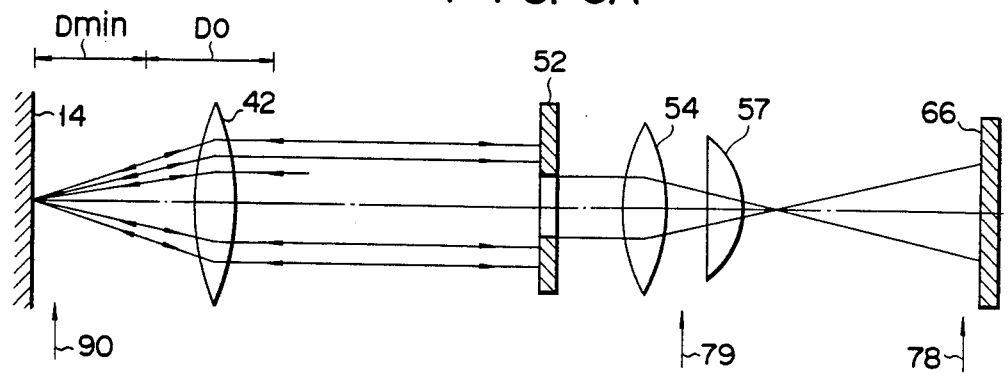
Figure 6B:
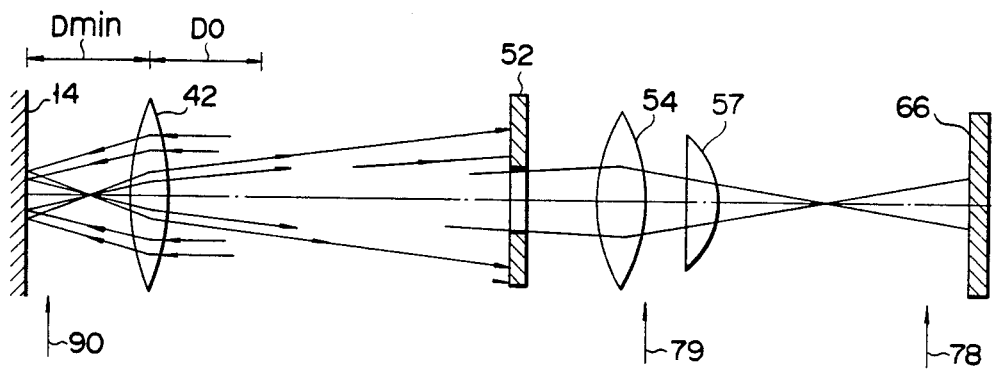
Figure 6C:
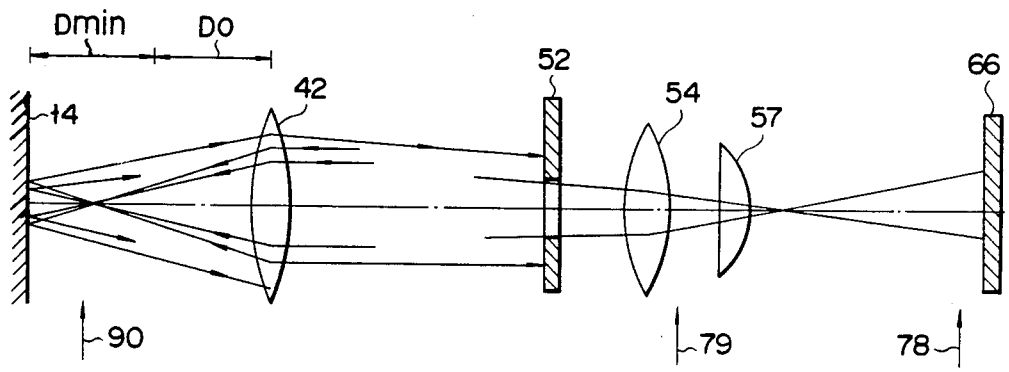
Figure 6D:
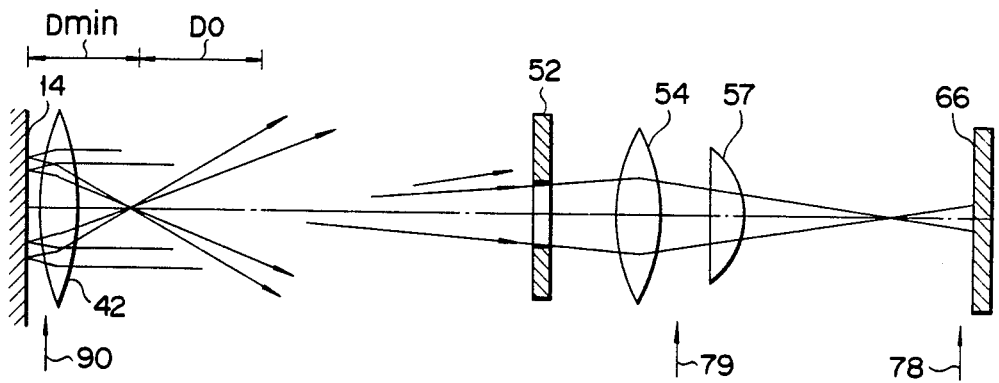

The mode of operation for detecting the just focusing state will be described with reference to FIGS. 4A to 4G, FIGS. 5A to 5E and FIGS. 6A to 6E. If the objective lens 42 is in the just focusing state, as shown in FIG. 3. FIG. 5A and FIG. 6A, the beam waist image 68 is formed on the light-receiving surface 66, as shown in FIG. 4A, by the laser beam component passing through the light-shielding plate 52. This beam waist image 68 is not converged in the direction of the base line of cylindrical lens 57, as shown in FIG. 5A, but converged in the direction of the short axis perpendicular to said base line, as shown in FIG. 6A. Thus it is formed in an elongated elliptical form. If the objective lens 42 comes close to the light-reflecting layer 14 of the optical disk 2, as shown in FIG. 5B and 6B a laser beam pattern 80 projected from the projection lens 54 is formed on the photosensitive region 70-1, as shown in FIG. 4B. In other words, if the objective lens 42 comes close to the light-reflecting layer 14, the beam waist is formed by the laser beam reflected from the light-reflecting layer 14 and a beam spot whose size is larger than the smallest beam spot is formed on the light-reflecting layer 14. Thus the beam waist is formed between the objective lens 42 and its focal point. Therefore, the laser beam directed from the beam waist to the objective lens 42 is converted to a diverged laser beam by the objective lens 42 and these beam is projected onto the light-shielding plate 52. Since the laser beam component passing through the light-shielding plate 52 is divergent, this component cannot be projected at the center of the light-receiving surface 66 of the photodetector 48 despite being converged by the projection lens 54 and the cylindrical lens 57. The laser beam component is deviated in the direction indicated by the arrow 76 and is projected onto the photosensitive region 70-1 to form a projected pattern 80. Conversely, as shown in FIG. 5C and 6C, if the objective lens 42 is far away from the light-reflecting layer 14 of the optical disk 2, a laser beam pattern 82 projected through the projection lens 54 is formed in the photosensitive region 70-3, as shown in FIG. 4C. In other words, if the objective lens 42 is placed far away from the light-reflecting layer 14, the divergent laser beam from the beam waist is incident on the light-reflecting layer 14, and a beam spot whose size is larger than the smallest beam spot is formed. The laser beam from this beam spot to the objective lens 42 is converted to converging laser beam by the objective lens 42 which is directed toward the light-shielding plate 52. The converging laser beam passing through the light-shielding plate 52 is converged by the projection lens 54 and the cylindrical lens 57 to form a beam waist. Thereafter, the beam is diverged again and is projected onto the photosensitive region 70-3.

Figure 7:
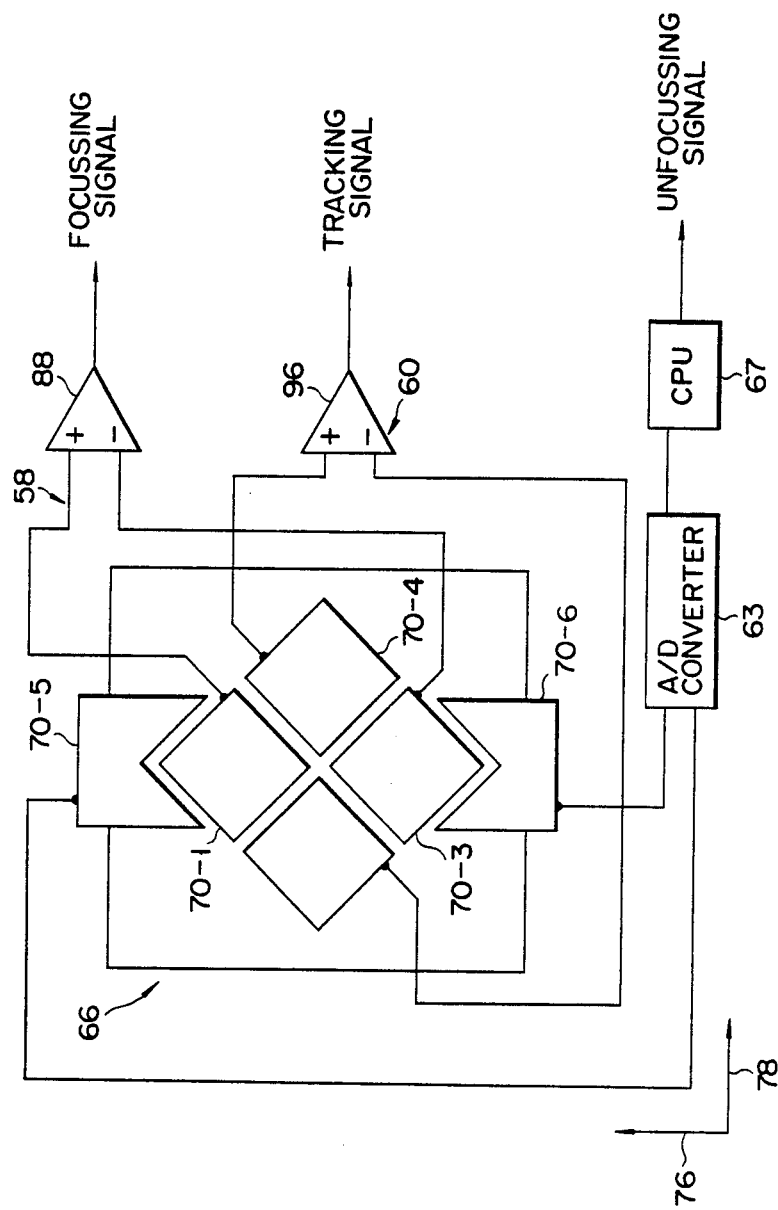
FIG. 7 is a block diagram of a focusing signal generator and a tracking signal generator which are connected to the photodetector shown in FIGS. 4A to 4G.
Figure 10:
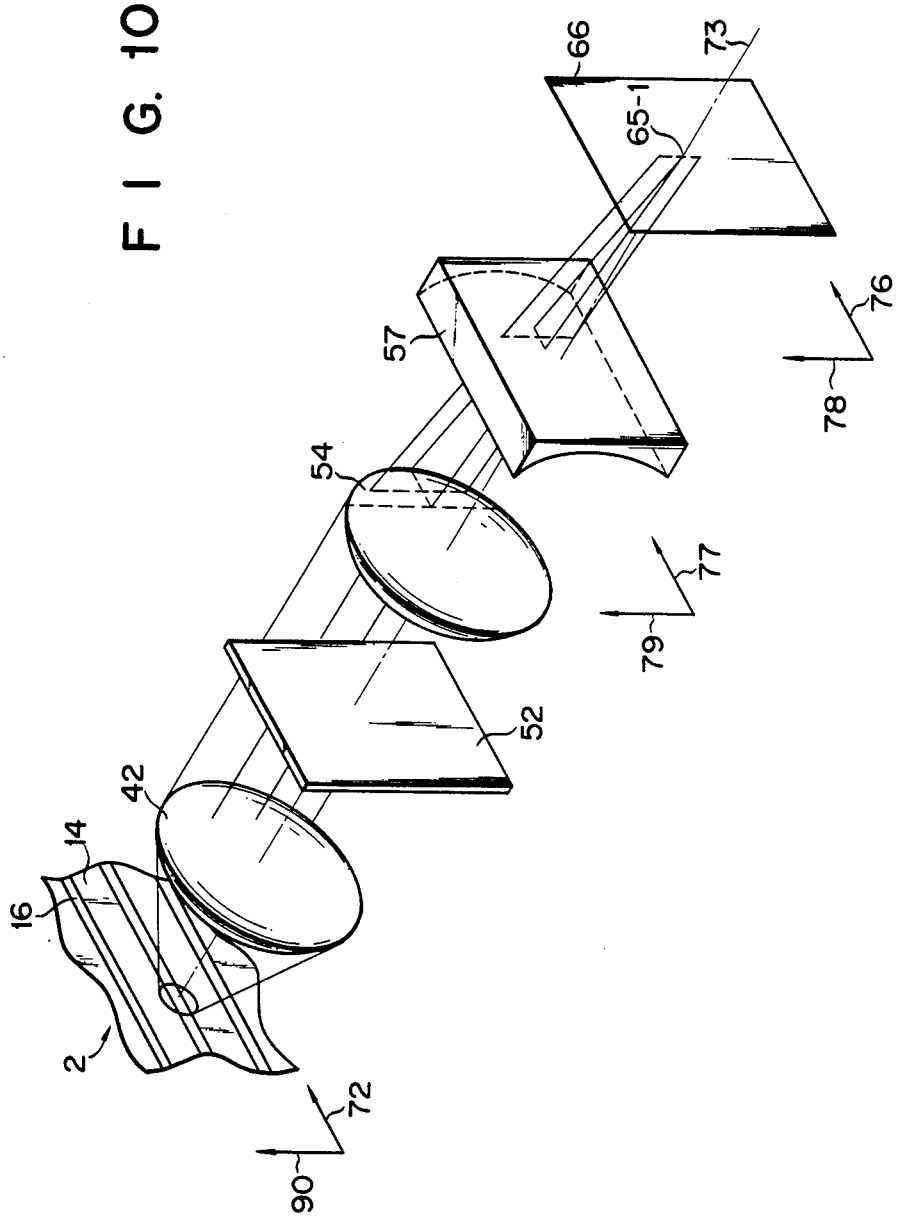
FIG. 10 is a perspective view of another optical system which may be used in the optical head shown in FIG. 1.

As is apparent from the above description, if the objective lens 42 is in the just focusing state, that area of the beam spot image which is formed in the photosensitive region 70-1 will be equal to that area of the same beam spot image which is formed in the photosensitive region 70-3, as shown in FIG. 4A. The photoelectric signal level generated from the photosensitive region 70-1 will be equal to the photoelectric signal level generated from the photosensitive region 70-3. Therefore, in a focusing signal generator 58 shown in FIG. 7, an output signal from the photosensitive region 70-1 will be at the same level as that from the photosensitive region 70-3. Thus, a comparator 88 connected to the photosensitive regions 70-1, 70-3 will not generate any focusing signal. As shown in FIG. 4B, even if the projected pattern corresponding to the diffraction pattern of the beam spot is formed on the light-receiver surface 66, a photoelectric signal is generated substantially only by the photosensitive regions 70-1, and the voice coil driver 62 is activated. As a result, the objective lens 42 is correctly moved away from the optical disk 2 by the voice coils 44. The objective lens 42 is then moved correctly toward the optical disk 2 in response to the focusing signal from the comparator 88 even if the projected pattern corresponding to the diffraction pattern of the beam spot is formed on the light-receiving surface 66, as shown in FIG. 4C.

The focusing operation described above is achieved when the objective lens 42 lies at a distance longer than a predetermined distance $D_{min}$ and shorter than a predetermined distance $(D_{min}+D_0)$ from the light-reflecting layer 14 that is, when the lens 42 is located in a region $D_0$ shown in FIGS. 5A to 5E. If the lens 42 is located at a distance shorter than the distance $D_{min}$, the level of a signal from the photosensitive region 70-1 is low and does not contain much noise, and there is the risk that the focusing signal generator 58 or the voice coil driver 62 erroneously operates. Conversely, if the lens 42 is located too far from the light-reflecting layer 14, beyond the region $D_0$, the level of a signal from the photosensitive region 70-3 is low and does not contain much noise, and there is the risk that the focusing signal generator 58 or the voice coil driver 62 erroneously operates.

Figure 6E:
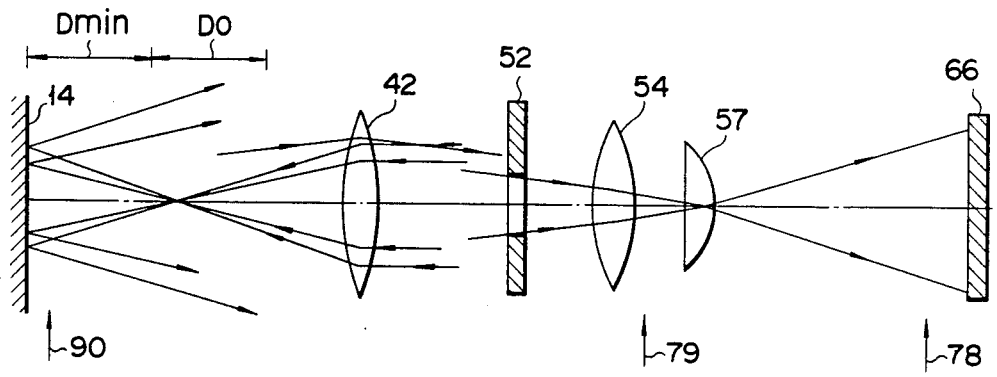

In order to prevent an erroneous operation of the focusing signal generator 58 or the voice coil driver 62, the photosensitive regions 70-5 and 70-6 both provided on the light-receiving surface 66 are effectively used. When the objective lens 42 gets too close to the light-reflecting layer 14 as shown in FIG. 5D, at a distance shorter than the distance $D_{min}$, only a portion of the diverged laser beam lands on the projection lens 54. The beam much deviates from the center of the light-receiving surface 66 and forms a large pattern 86 on the photosensitive regions 70-1 and 70-5 as illustrated in FIG. 4D. The photoelectric signal from the photosensitive region 70-5 is converted by the A/D converter 67 into a digital signal, which is supplied as an alarm signal to the CPU 67. When the objective lens 42 moves too far beyond the region D as shown in FIGS. 5E and 6E, the converged laser beam lands on the projection lens 54. The beam much deviates from the center of the light-receiving surface 66 and forms a relatively large projection pattern 87 on the photosensitive regions 70-3 and 70-5 as shown in FIG. 4E. The photoelectric signal from the photosensitive region 70-5 is converted by the A/D converter 67 into a digital signal, which is supplied to the CPU 67 as an alarm signal.

As described above, in response to an alarm signal the switching circuit 61 opens. As a result, the objective lens 42 is moved to a position within the region $D_0$.

The operation for tracking the tracking guide on the light-reflecting layer 14 of the optical disk 2 with the laser beam, that is, the tracking operation, will be described with reference to FIG. 3, FIG. 4A to 4G, and FIG. 8. When the galvano mirror 38 shown in FIG. 1 is inclined, the laser beams reflected from the galvano mirror 38 are also reoriented. A laser beam spot 62 formed on the light-reflecting layer is moved in the direction indicated by the arrow 90 shown in FIG. 3. The beam waist 62 has a diameter larger than a width of the tracking guide 16. As shown in FIG. 8, if beam waist 67-1 is properly projected onto a tracking guide 71-1, an image 74-1 of tracking guide 71-1 is formed within a image 68 of the beam waist 67-1 on the light-receiving surface 66 of the photodetector 48, as shown in FIG. 4A. However, if beam waist 67-2 and 67-3 are not properly projected onto tracking guides 71-2 and 71-3 and only parts of the beam waists 67-2 and 67-3 are formed on the tracking guides 71-2 and 72-3, respectively, only parts of images 74-2 and 74-3 of the tracking guides 71-2 and 71-3 are formed in images 68-2 and 68-3 of the beam waists 67-2 and 67-3, respectively, as shown in FIGS. 4F and 4G. If light rays are incident on the tracking guides 71-1 to 71-3, the light rays are diffracted at the edges of the tracking guides 71-1 to 71-3. Therefore, the images 68-1, 68-2 and 68-3 of the tracking guides 71-1, 71-2 and 71-3 are less bright than other image portions in the beam waist images 68, 68-2 and 68-3, resulting in the formation of dark regions. Therefore, as shown in FIG. 4A, when the beam waist 67-1 is properly projected onto the tracking guide 71-1, and the image 74-1 of the tracking guide 71-1 is formed on the light-receiving surface 66, the brightness of the photosensitive region 70-2 is substantially the same as that of the photosensitive region 70-4. However, if the beam waists 67-2 and 67-3 respectively are not properly projected onto the tracking guides 71-2 and 72-3 shown in FIG. 8, and if only parts of the images 74-2 and 74-3 of the tracking guides 71-2 and 71-3 are formed as shown in FIG. 4F and 4G, the brightness of the photosensitive region 71-2 is not the same as, that is, larger or smaller than that of the photosensitive region 70-4. However, when the image 74-1 of the tracking guide 71-1 is properly formed on the light-receiving surface 66, an output signal from the photosensitive region 70-2 has substantially the same level as an output signal from the photosensitive region 70-4. Thus, no tracking signal is generated from a comparator 96. However, when the image 74-2 of the tracking guide 71-2 is formed on the photosensitive regions 70-2 and 70-4, as shown in FIG. 4F, an output signal level of the photosensitive region 70-2 is lower than that of the region 70-4, so that the comparator 96 generates a tracking signal and the laser beam is shifted to separate in the opposite direction to that indicated by the arrow 90 in FIG. 3 by the galvano mirror 38, which is driven by the galvano mirror driver 64. Thus, the beam spot 67 is properly formed on the tracking guide 71. However, if the image 74-3 of the tracking guide 71-3 is formed on the photosensitive regions 70-1 and 70-3, as shown in FIG. 4G the galvano mirror driver 64 is activated in response to the tracking signal from the comparator 96 such that the laser beam is moved along the direction indicated by the arrow 90 by the galvano mirror 38.

In the optical head shown in FIG. 1, the galvano mirror 38 moves the laser beam spot in the direction 90 perpendicular to the tracking guide 71. However, the objective lens 42 may be moved, perpendicularly to its optical axis to move the laser beam spot, instead of the galvano mirror 38. Alternatively, another mechanism may be employed to move the laser beam spot across the tracking guide 71. In FIGS. 4A, 4F and 4G, the images 74-1, 74-2 and 74-3 of the tracking guides 71-1, 71-2 and 71-3 are respectively formed on the light-receiving surface 66 when the objective lens 42 is kept in the just focusing state. However, as shown in FIGS. 4B and 4C, when the projected patterns 80 and 82 are formed, the images of the tracking guides are not formed, but diffraction patterns 74-4 and 74-6 of the tracking guide 71 are formed within the projected patterns, respectively. The diffraction patterns 74-4 and 74-6 are darker than other regions in the images of the tracking guides. Therefore, even if the objective lens 42 is not in the just focusing state, it can be detected whether or not the beam spot is properly formed on the tracking guide 71.

As is apparent from the comparison between illustrations in FIGS. 4A, 4F and 4G and FIGS. 4B to 4C, the movement of the projected pattern in the direction of arrow 76 allows detection of the focusing state of the objection lens 42. Changes in brightness in the direction of arrow 78 allow tracking. Thus, focus detection and tracking are independently performed.

The photosensitive regions 70-1 to 70-6 may be arranged as shown in FIG. 9. More specifically, the square photosensitive regions 70-1 to 70-4 are arranged between the rectangular photosensitive regions 70-5 and 70-6 and along the directions 76 and 78. The photosensitive regions 70-1 and 70-2 are connected to an adder 84, the photosensitive regions 70-3 and 70-4 are connected to an adder 85. The output signals from the adders 64 and 85 are supplied to a comparator 88. The comparator 88 generates a signal which represents the difference between the output signals from the adders 84 and 85. The photosensitive regions 70-1 and 70-3 are connected to an adder 92, and the photosensitive regions 70-2 and 70-4 are connected to an adder 94. The output signals from the adders 92 and 94 are supplied to a comparator 96. The comparator 96 generates a tracking signal which represents the difference between the signals from the adders 92 and 94.

Some modifications of this invention will hereinafter be described with reference to FIGS. 10, 11, 12A, 13 and 14. In the embodiment shown in FIG. 3, the cylindrical lens 58 is a convex lens. The lens 58 may be a concave lens, as shown in FIG. 18. Further, as shown in FIG. 18, a knife edge or a slit may be used in place of the aperture as the light-shielding plate 50. In the optical system having the concave cylindrical lens 58, it is preferable that the light-shielding surface 66 be located at the short focal point 65-1 in order to improve the detection sensitivity.

In the above various embodiments, in order to move the pattern of the laser beam projected on the light-receiving surface 66 in accordance with the distance between the objective lens 42 and the light-reflecting layer 14, only part of the laser beam, which passes through that area deviated from the optical axis extending between the objective lens 42 and the projection lens 54, is picked up by the light-shielding plate 52 or the cylindrical lens 57.

The other optical systems shown in FIGS. 11, 12A, 13 and 14 can change the direction of the laser beam directed from the projection lens 54 to the photodetector 48 in accordance with the distance between the objective lens 42 and the light-reflecting layer 14. In the optical systems shown in FIGS. 11 to 14, the tracking operation can be performed in the same manner as in the optical systems described above, therefore a detailed description thereof will be omitted.

Figure 11:
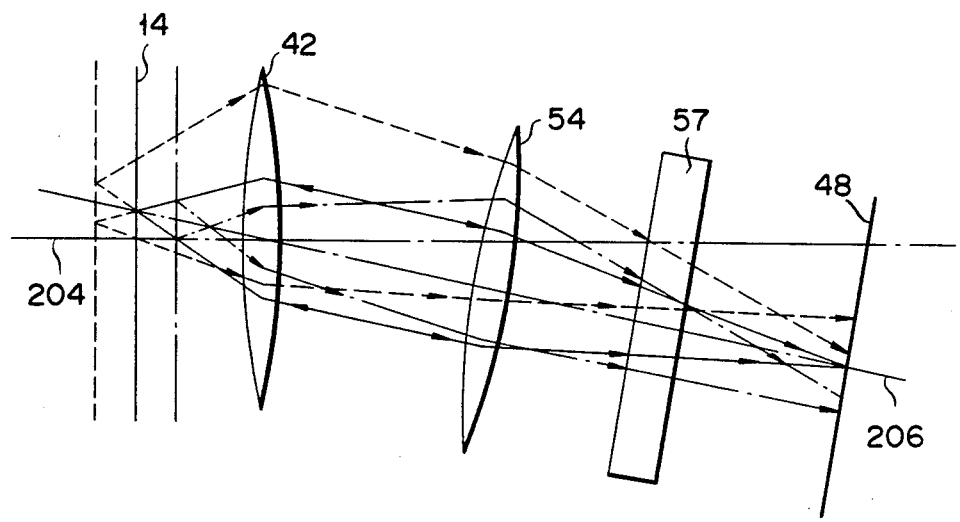
FIGS. 11, 12A, 13 and 14 are schematic views of other optical system according to the invention.

In the optical system shown in FIG. 11, an objective lens 42 and the projection lens 54 are arranged so that an optical axis 204 of the objective lens 42 crosses an optical axis 206 of the projection lens 54. The surface of the light-reflecting layer 14 is perpendicular to the optical axis 204 of the objective lens 42, while the surface of the light-receiving surface 66 of the photodetector 48 is perpendicular to the optical axis 206 of the projection lens 42. The laser beam with a beam diameter corresponding to the diameter of the objective lens 42 is incident thereon along the optical axis 206 of the projection lens 54. Therefore, if the objective lens 42 is in the just focusing state, the laser beams projected through the objective lens 42 form the smallest beam spot corresponding to the beam waist on the light-reflecting layer 14. As indicated by the solid lines, the laser beam reflected by the light-reflecting layer 14 is directed toward the objective lens 42. The laser beam transmitted through the objective lens 42 is converted to a parallel laser beam and converged by the cylindrical lens 57 and the projection lens 54 which is inclined to the optical axis of the objective lens 42. The converted laser beam is then projected on the light-receiving surface 66 positioned on the image-forming plane determined by the objective and projection lenses 42 and 54. Thus, the smallest beam spot image is formed on the light-receiving surface 66. However, if the objective lens 42 is in the defocusing state, the laser beam is guided along the optical path indicated by the broken lines and the alternate long and short dash lines, projected through the projection lens 54 and directed toward the light-receiving surface 66. Therefore, the projected pattern shown in FIGS. 4B and 4C is formed on the light-receiving surface 66.

Figure 12A:
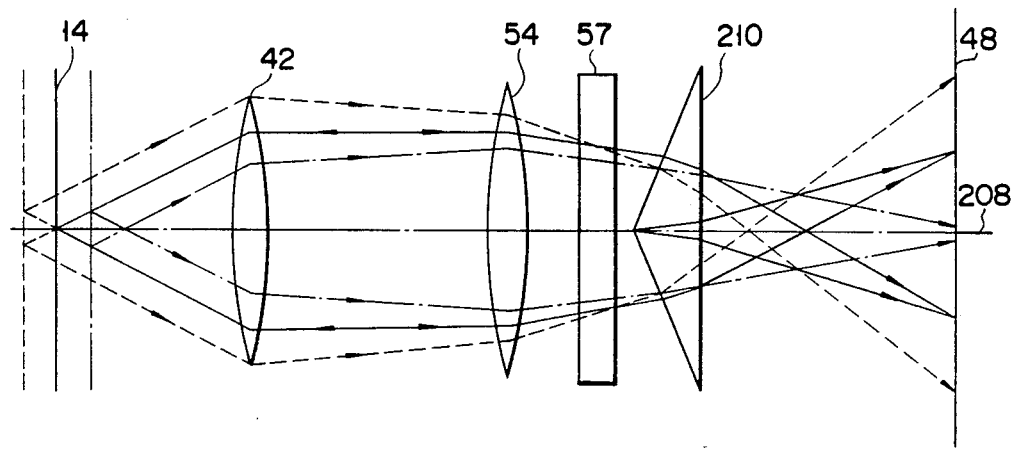
Figure 12B:
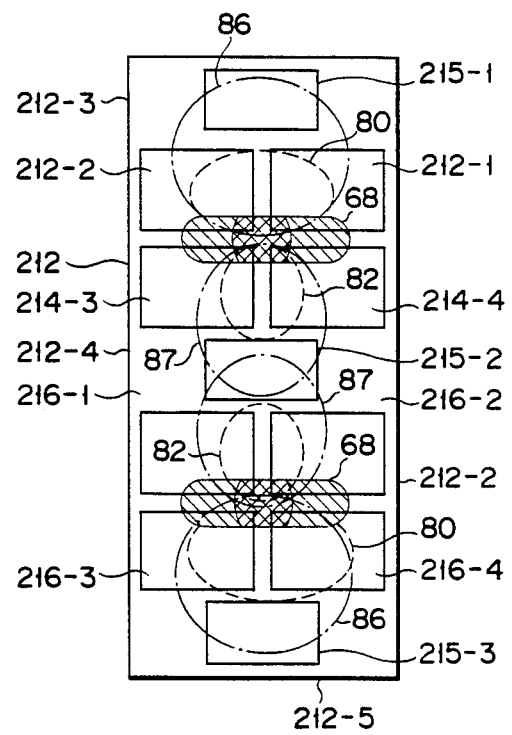
FIG. 12B is a plan view of the light receiving surface of the photodetector shown in FIG. 12A.

In the optical system shown in FIG. 12A, the objective lens 42, the projection lens 54 and a Fresnel biprism 110 are arranged along a common optical axis 108. The light-reflecting layer 14 and a light-receiving surface 212 of the photodetector 48 are perpendicular to the optical axis 208. The light-receiving surface 212 is positioned on the image-forming plane determined by the objective lens 42, the cylindrical lens 57 and the projection lens 54. As shown in FIG. 12B, the light-receiving surface 212 has four segment surfaces 212-1, 212-2, 212-3, 212-4 and 212-5. The segment surfaces 212-1 and 212-2 have photosensitive regions 214-1, 214-2, 214-3 and 214-4 and photosensitive regions 216-1, 216-2, 216-3 and 216-4, respectively, and the segment surfaces 212-3, 212-4 and 212-5 have photosensitive regions 215-1 215-2 and 215-3, respectively, in the same manner as the light-receiving surface 66 shown in FIG. 4A. In the optical system shown in FIG. 12A, if the objective lens 42 is in the just focusing state, the laser beam passing through the cylindrical lens 57 is converged by the projection lens 54 as indicated by the solid lines, and is split by the biprism 210. The split laser beams are projected on the light-receiving surface 212. Therefore, as shown in FIG. 12B, the smallest beam spot images 68 are formed on the segment surfaces 212-1 and 212-2 of the light-receiving surface 66, respectively. However, if the objective lens 42 is in the defocusing state, the converged laser beam indicated by the broken lines or diverged laser beam indicated by the alternate long and short dashed lines is incident on the projection lens 54. The converged laser beam is converged by the cylindrical lens 57 and the projection lens 54, so that it has a waist between the biprism 210 and the light-receiving surface 212. As a result a pair of projected patterns 80 which are spaced apart are formed on the light-receiving surface 212, as indicated by the broken lines. On the other hand, the diverged laser beams are converted to a converged laser beam by the cylindrical lens 57 and the projection lens 54. In this case, the beam has a waist not between the biprism 210 and the light-receiving surface 212 and the laser beams are projected on the light-receiving surface 212. Therefore, a pair of projected patterns 82, which are close to each other as shown by the broken lines, are formed on the light-receiving surface 212 as shown in FIG. 12B. When the laser beam projected to the light-receiving surface 212 deviates to a relatively large extent, either pattern 86 or 87 which is relatively large will be projected on the light-receiving surface 212.

Figure 13:
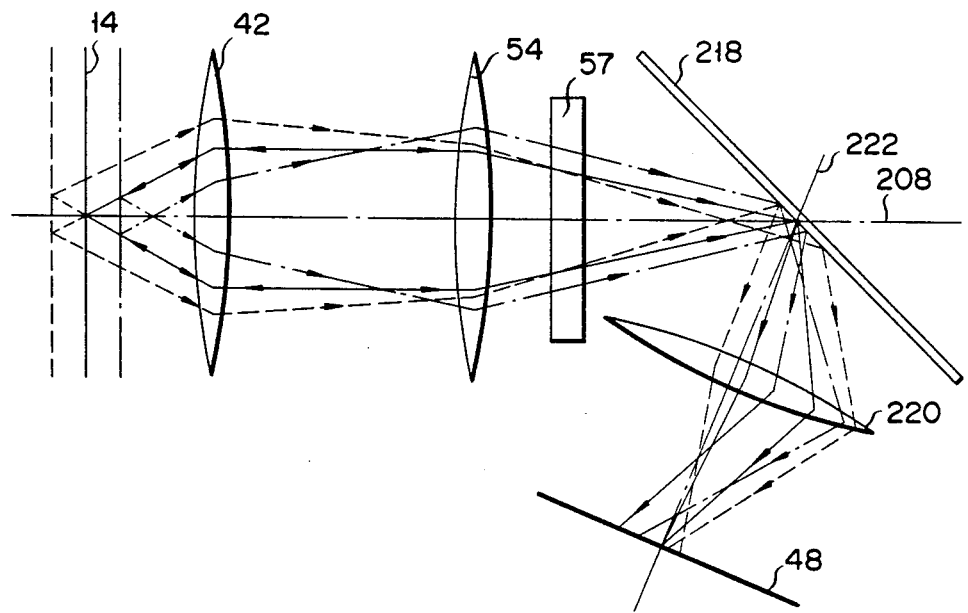

In the optical system of FIG. 13, a mirror 218 lies on the common optical axis 208 of the lenses 42, 54 and 57. The convergent lens 220 is disposed between the mirror 218 and the light-receiving surface 66 of the photodetector 48. The mirror 218 is arranged on the image-forming point determined by the objective lens 44 and the projection lens 54, and the light-receiving surface 66 lies perpendicular to the optical axis 222 of the convergent lens 220. If the objective lens 42 is in the just focusing state, the laser beam passes through the optical path which is indicated by the solid lines and the smallest beam spot image is formed on the mirror 218. The smallest beam spot image on the mirror is transferred by the convergent lens 220 to the light-receiving surface 66. However, if the objective lens 42 is in the defocusing state, a converged laser beam is indicated by the broken lines or diverged laser beam is indicated by the alternate long and short dashed lines incident on the cylindrical lens 57 and the projection lens 54 in the same manner as in the previous embodiments. These laser beams are converged by the projection lens 54 and the laser beams reflected from the mirror 218 is directed to the convergent lens 220. However, when these laser beams reflected from the mirror 218 are converged by the convergent lens 220, projection patterns shown in FIGS. 4B and 4C are formed on the light-receiving surface 66 due to different travelling directions, respectively.

Figure 14:
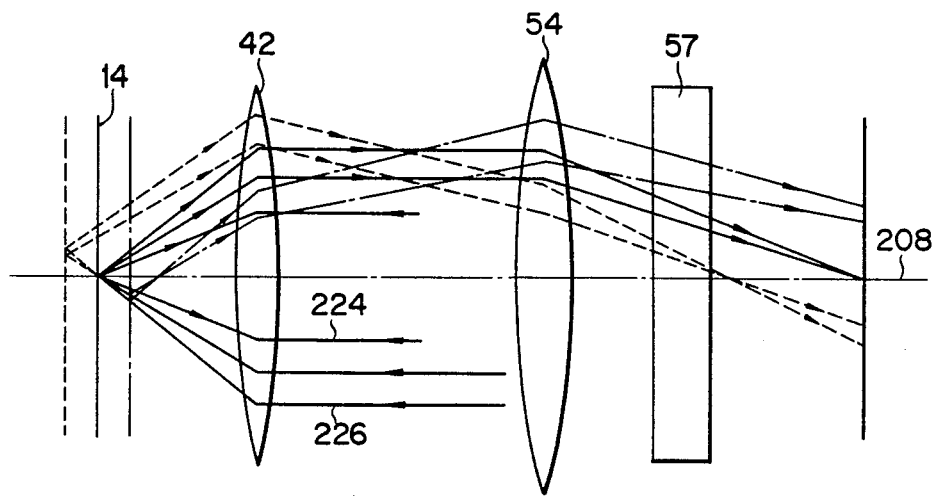
Figure 15:
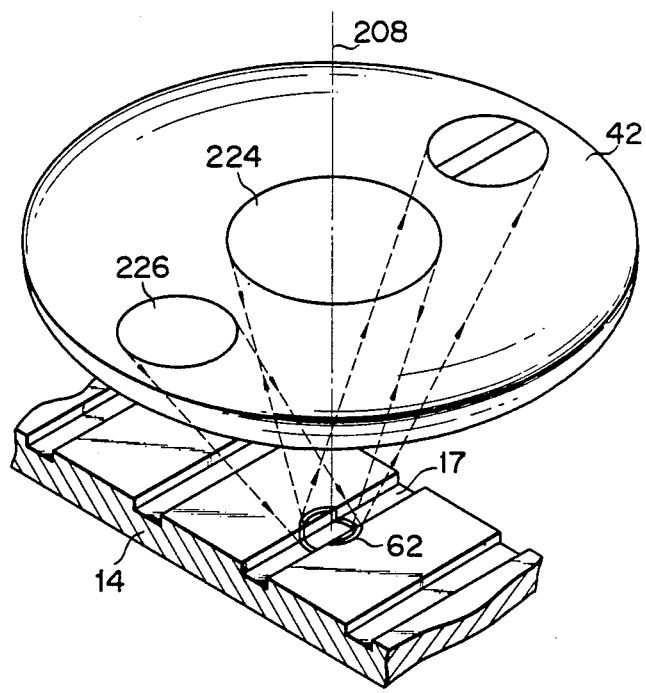
FIG. 15 is a perspective view of the optical system shown in FIG. 14, illustrating various laser beam paths and various laser beam spots.

In the optical system shown in FIGS. 14 and 15, the objective and projection lenses 42 and 54 are arranged on the common optical axis 208. In the optical system shown in FIGS. 14 and 15, first and second laser beams 224, 226 and incident on the objective lens 42. The first laser beam 224 for recording and reproducing the information is transmitted along the optical axis 208 and the second laser beam 226 for focusing and tracking the laser beam 224 is transmitted along a optical path 208 which is remote from, and is parallel with, the optical axis 208. On the light-reflecting layer 14, two beam spots are formed by the two beams as shown in FIG. 15. When the objective lens 42 in the just focusing state the smallest beam spots corresponding to the beam waists of the two laser beams 224, 226 are formed on the light-reflecting layer 14. Therefore, the first and second laser beams 224, 226 form the images of the smallest beam spots on the center region of the light-receiving surface 66 of the photodetector 48, only the first laser beam being indicated by the solid line. When the objective lens 42 is in the defocusing state, the beam spots larger than the smallest beam spots are formed on the light receiving surface 66. The first laser beam 224 forms the projected pattern on the center region of the light-receiving surface 66, but the second laser beam 226 passing through the optical paths indicated by the broken line or the alternate long and short dash line is deviated on the light-receiving surface 66 and forms the projected pattern on the upper or lower regions of the light-receiving surface 66. Therefore, the optical system shown in FIGS. 22 and 23 can detect the focusing state of the objective lens. In FIG. 15, the tracking guide is formed as a recess on the light reflecting layer instead of the projected tracking guide.

In the embodiments shown in FIGS. 10, 11, 12A, 13 and 14 the laser beams travelling toward the objective lens 42 are parallel laser beams. However, converged or diverged laser beams may be used to detect the focusing state of the objective lens in the same manner as in the optical system shown in FIG. 1. The optical systems shown in FIGS. 1, 3, 10, 12A, 13 and 15 are provided each with a cylindrical lens 57. The invention, however, is not limited to an optical system with a cylindrical lens.

It is to be understood that the photodetector with the photoinsensitive regions of the present invention is not limited to the use with the above-mentioned various optical systems, and may be also applied to those optical systems which are disclosed in the U.S. Pat. Nos. 4,079,247 and 4,079,248. Furthermore, the photosensitive regions 70-5 and 70-6 may be arranged in both sides of the square array of the photosensitive regions 70-5 and 70-6. In this arrangement, when the objective lens is in the unfocusing state, the relatively large pattern is partly formed on one of or both of the photosensitive regions 70-5 and 70-6. Therefore, the unfocusing state is accurately detected by the photodetector 48.

Explanation has been made in connection with the embodiment in which the optical disk is equipped with a tracking guide and the tracking guide image is formed on the light-receiving surface of the photodetector. In this connection it is to be noted that, even if the optical disk is not equipped with the tracking guide, an image corresponding to the tracking guide image is formed on the light-receiving surface. That is, when the optical disk is rotated at high speeds, information pits formed on the light-reflecting layer of the optical disk describes a pattern as a rotation locus which is similar to that of the tracking guide, permitting a corresponding image to be formed on the light-receiving surface. It is to be noted in this connection that in this specification the locus pattern corresponding to the information pits is treated as the tracking guide.

According to this invention, during the just focusing state of the objective lens the light-reflecting layer of the optical disk and light-receiving surface of the photodetector are located at the objective point and image-forming point as determined by the objective lens, cylindrical and projective lens, respectively, permitting an image of a minimum beam spot corresponding to a beam waist to be formed on the light-receiving surface. Even if the light-reflecting layer of the optical disk is inclined and thus ceases to be in an orthogonal relation to the optical axis of an objective lens, judgement can be made as to whether or not the objective lens is exactly in the just focusing state without causing the beam spot image to be displaced on the light-receiving surface. Even when dirt or a defect is present on the laser beam path of the optical system, a beam spot image is formed on the image-forming point during the just focusing state of the objective lens without involving any displacement of the beam spot image by the dirt or defect. Where the light-shielding plate is arranged in a Fourier transform plane as defined by the projection lens, no pattern on the light ray transmitting area on the light-shielding plate emerges on the light-receiving area during the just focusing state of the objective lens, permitting the just focusing state to be accurately detected.

Further when the objective lens is at the just focussing state, the beam spot image formed on the light-receiving surface of the photodetector is in an elongated elliptical shape, and when the beam waist traverses the tracking guide, the tracking guide image moves within this elongated beam spot image. This serves to judge whether the beam waist is properly formed on the tracking guide. On the other hand, this elongated beam waist image at the just focusing state changes into a comparatively large elliptical pattern in the defocusing state. The elliptical pattern is formed apart from the center of the light-receiving of the photodetector. This serves to accurately detect the defocusing state. Further, as the direction in which this elliptical pattern deviates from the center of the light-receiving surface is almost perpendicular to the direction in which the tracking guide image moves within the beam spot image. Furthermore, the follow-up of the tracking guide and detecting of the just focusing state can accurately be made by a single photodetector.

Moreover, in the present invention the photodetector detects that the objective lens approaches too close to, or too far from, the light-reflecting layer. When the photodetector detects this, the objective lens is moved away from or toward the light-reflecting layer until the lens comes to a proper distance from the light-reflecting layer, not controlled by a focusing signal. This prevents an erroneous moving of the objective lens which might occur when the lens is controlled by a focusing signal containing much noise.

What is claimed is:

1. A system for focusing a light beam on a light-reflecting surface, comprising:
   means for generating a light beam;
   an objective lens for converging said light beam and projecting the converged beam to the light-reflecting surface;
   means for transferring a light beam reflected from the light-reflecting surface; and
   a photodetector having a first section including a photosensitive region and a second section including two photosensitive regions, said first section receiving a light beam from the transferring means when the objective lens is positioned at a distance shorter than a first predetermined distance from the light reflecting-surface or longer than a second predetermined distance from the light-reflecting surface, and said second section receiving a light beam from the transferring means when the objective lens is positioned at a distance longer than the first predetermined distance and shorter than the second predetermined distance.

2. A system according to claim 1, wherein when the objective lens is positioned at a focusing position between said first and second predetermined distances, it forms a beam spot, corresponding to the waist of the light beam, on the light-reflecting surface.

3. A system according to claim 2, wherein said transferring means includes a projection lens for directing the light beam toward the light receiving surface of the photodetector, which has an optical axis intersecting the optical axis of the objective lens, and the light-receiving surface of the photodetector is arranged on an image forming plane on which an image of the beam spot corresponding to the beam waist is formed by the objective lens and the projection lens when the beam spot corresponding to the beam waist is formed on the light-receiving surface.

4. A system according to claim 2, wherein said transferring means includes first and second projection lenses and a mirror, so that an image of the beam spot corresponding to the beam waist is formed on the mirror by the objective lens and the first projection lens, and that the image on the mirror is transferred onto the light receiving surface of the photodetector by the second projection lens.

5. A system according to claim 1, further comprising means for receiving photoelectric signals from the photosensitive regions of the second section to and generating a focusing signal, means for moving the objective lens according to said focusing signal, and means for disconnecting the focusing signal generating means and the objective lens moving means in response to a photoelectric signal from the photosensitive region of the first section.

6. A system according to claim 1 or 5, further comprising means for moving the objective lens to a position at a distance between said first and second predetermined distances in response to a photoelectric signal from the photosensitive region of the first section.

7. A system according to claim 1, wherein said transferring means further includes means for deflecting a light beam supplied from the objective lens to the light-receiving surface, according to the distance between the objective lens and the light-reflecting surface.

8. A system according to claim 7, wherein the photosensitive regions of the first and second sections are arranged in the direction in which moves a pattern formed on the light-receiving surface by a light beam deflected by the deflecting means.

9. A system according to claim 8, wherein said second section includes two further photosensitive regions and the four photosensitive regions of the second section each have a square light-receiving surface said four regions together forming a substantially square light-receiving surface larger than each of the photosensitive regions.

10. A system according to claim 1 or 7, wherein said first section includes further photosensitive region, and said second section is located between the two photosensitive regions of the first section.

11. A system according to claim 10, wherein said means for deflecting the light beam is a light shielding plate to transmit light beams passing through only those areas which are off the optical axis of the projection lens.

12. A system according to claim 10, wherein said means for deflecting the light beam is a biprism.

13. The system according to claim 10, wherein said deflecting means includes means for directing a light beam in parallel with the optical axis of the objective lens through an area arranged off the optical axis.

14. A system according to claim 1, wherein said light beam generating means comprises means for generating a laser beam.

15. A system according to claim 1, wherein said transferring means includes a projection lens for directing a light beam toward the light-receiving surface of the photodetector and means for deflecting the light beam in accordance with the distance between the objective lens and the light-reflecting surface, and the light-receiving surface of the photodetector is arranged on an image forming plane on which an image of the beam spot corresponding to the beam waist is formed by the objective lens and the projection lens when the objective lens is in the just focusing state.

16. The system according to claim 1, wherein said transferring means includes a cylindrical lens arranged between the objectives lens and the photodetector.

* * * * *